United States Patent
Gill et al.

(10) Patent No.: US 6,950,113 B2
(45) Date of Patent: *Sep. 27, 2005

(54) METHOD AND APPARATUS FOR AUTOMATICALLY DISPLAYING AND MANIPULATING IDENTIFIERS OF A MECHANICAL DESIGN

(75) Inventors: David L. Gill, San Diego, CA (US); William E. Bogan, Lakeside, CA (US); Kanan Lozon, San Diego, CA (US)

(73) Assignee: Autodesk, Inc., San Rafael, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/286,722

(22) Filed: Nov. 1, 2002

(65) Prior Publication Data

US 2003/0122849 A1 Jul. 3, 2003

Related U.S. Application Data

(63) Continuation of application No. 09/495,030, filed on Jan. 31, 2000, now Pat. No. 6,496,195.

(51) Int. Cl.⁷ .............................................. G09G 5/00
(52) U.S. Cl. ...................................... 345/619; 345/650
(58) Field of Search ................................ 345/619, 650, 345/700, 703, 522, 620, 624, 653–654, 661, 664–665, 671, 630, 625; 700/260, 263; 709/323, 328, 321, 101, 202, 219

(56) References Cited

U.S. PATENT DOCUMENTS

| | | | |
|---|---|---|---|
| 4,843,569 A | * 6/1989 | Sawada et al. ............. 382/180 |
| 5,237,647 A | 8/1993 | Roberts et al. | |
| 5,386,504 A | 1/1995 | Yoda et al. | |
| 5,526,478 A | * 6/1996 | Russell et al. .............. 715/512 |
| 5,559,707 A | 9/1996 | DeLorme et al. | |
| 5,617,524 A | 4/1997 | Dao et al. | |
| 5,625,827 A | 4/1997 | Krause et al. | |
| 5,724,072 A | * 3/1998 | Freeman et al. ............ 345/648 |
| 5,745,761 A | 4/1998 | Celi, Jr. et al. | |
| 5,774,720 A | 6/1998 | Borgendale et al. | |
| 5,831,633 A | 11/1998 | Van Roy | |
| 5,835,693 A | * 11/1998 | Lynch et al. ................ 345/473 |
| 5,845,288 A | 12/1998 | Syeda-Mahmood | |
| 6,243,102 B1 | 6/2001 | Ruff et al. | |
| 6,289,396 B1 | 9/2001 | Keller | |
| 6,366,293 B1 | 4/2002 | Hamilton et al. | |
| 6,496,195 B1 | * 12/2002 | Gill et al. ................... 345/619 |
| 6,768,928 B1 | 7/2004 | Nagasawa et al. | |
| 2003/0165264 A1 | * 9/2003 | Tanabe et al. .............. 382/141 |

OTHER PUBLICATIONS http://www/ugsolutions.com/products/unigraphics/cad/drafting/, printed May 1, 2000, 2 pgs.

Krause et al., "Processing of CAD–Data—Conversion, Verification and Repair", *Solid Modeling*, pp. 248–254, 1997.

Vivier et al., "Annotation: an AI Approach to Engineering Drawing Annotation" ACM SIGART, Mar. 1988, pp. 447–455.

Hutton et al., "A Strategy for On–Line Interpretation of Sketched Engineering Drawings", IEEE, 1997, pp. 771–775.

Nousch et al., "CAD on the World Wide Web: Virtual Assembly of Furniture with BEAVER", SIGGRAPH, ACM Feb. 1999, pp. 113–119.

* cited by examiner

*Primary Examiner*—Matthew C. Bella
*Assistant Examiner*—Wesner Sajous
(74) *Attorney, Agent, or Firm*—Fish & Richardson P.C.

(57) ABSTRACT

Computer instructions that operate to determine if one or more geometry pieces of a mechanical design are within a view boundary and automatically generate and order one or more identifiers corresponding to the geometry pieces within the view boundary, when executed, is disclosed. In one embodiment, the computer instructions are part of a mechanical design software application. In one embodiment, the mechanical design software application including the computer instructions are embodied in a distribution storage medium.

12 Claims, 7 Drawing Sheets

METHOD AND APPARATUS FOR AUTOMATICALLY DISPLAYING AND MANIPULATING IDENTIFIERS OF A MECHANICAL DESIGN

This application is a continuation of application Ser. No. 09/495,030, filed Jan. 31, 2000, now U.S. Pat. No. 6,496,195.

FIELD OF INVENTION

The present invention relates to the field of computer aided design (CAD). More specifically, the present invention relates to computer assistance to a designer working with identifiers of a drawing of a mechanical design.

BACKGROUND OF THE INVENTION

Most mechanical designs require a designer to create a drawing to identify geometry pieces that make up components of a mechanical design. An example of components of a mechanical design is a nut and bolt assembly where the nut and bolt make up the components of the assembly. Once a designer has completed the geometry pieces of an assembly, the designer creates a display, usually in the form of a drawing, identifying the individual components that make up the assembly. For the purposes of this application, the geometry pieces that make up the components of a mechanical design are solid CAD geometry pieces and shall be generically referred to as geometry pieces.

Generally, identifying individual geometry pieces of an assembly is labor intensive requiring creation of an identifier, usually in the form of an identity symbol and a leader from the geometry piece to the identity symbol, for each geometry piece in separate sequence of commands, multiple executions of the same commands, and a large number of key strokes. Thus, as the number of geometry pieces of an assembly increases, the time required to identify the geometry pieces increases. Moreover, once the identifiers have been created, a users has difficulty changing the position of the identifier because the ordering of the geometry pieces would have to be manually changed to remain consistent with the identifier position.

Thus, a more user friendly approach for creating identifiers and manipulating identifiers of geometry pieces of an assembly is desired. As will be described in more detail below, the present invention achieves these and other desirable objectives, which will be apparent from the disclosure to follow.

SUMMARY OF THE INVENTION

Computer instructions that operate to determine if one or more geometry pieces of a mechanical design are within a view boundary and automatically generate and order one or more identifiers corresponding to the geometry pieces within the view boundary, when executed, is disclosed. In one embodiment, the computer instructions are part of a mechanical design software application. In one embodiment, the mechanical design software application including the computer instructions are embodied in a distribution storage medium.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

Figure 1:
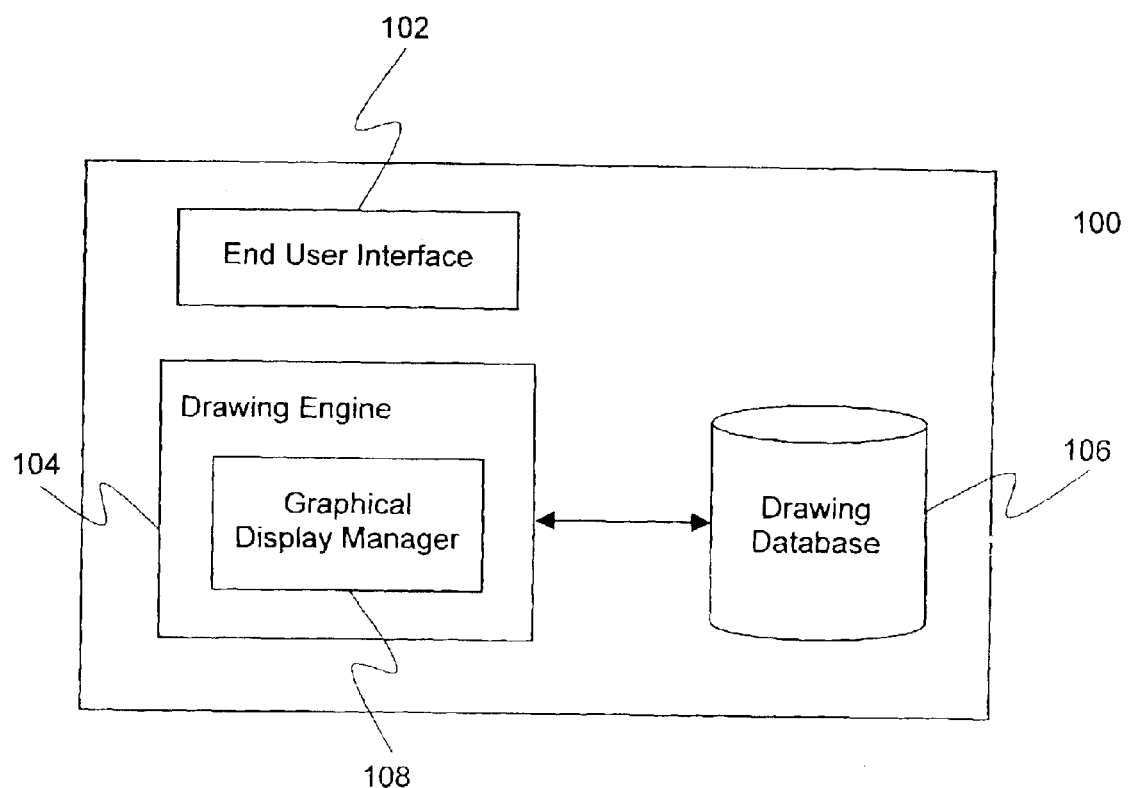
FIG. 1 illustrates one embodiment of a mechanical design software application incorporated with the teachings of the present invention.

Referring now to FIG. 1, wherein a block diagram illustrating one embodiment of a computer aided design (CAD) drawing application is shown. As illustrated, drawing application 100 includes end user interface 102, drawing engine 104, and drawing database 106. Drawing engine 104 includes in particular graphical display manager 108 incorporated with the teachings of the present invention. Together, the elements cooperate to facilitate drawing of mechanical designs by a designer. More specifically, end user interface 102 operates to facilitate graphical displays of drawings of mechanical designs for the designer, under the control of drawing engine 104. Drawing database 106 facilitates storage of drawing entities required by the designer, also under the control of drawing engine 104. In particular, graphical display manager 108 automatically generates identifiers corresponding to geometry within a view bounds. In accordance with the present invention, the automated generation is provided responsive to detection of different geometry pieces of a mechanical drawing, to be described more fully below. Except for the teachings of the present invention incorporated in graphical display manager 108, drawing application 100 is intended to represent a broad range of computer aided design (CAD) drawing software known in the art, including but not limited to Mechanical Desktop®, available from Autodesk, Inc. of San Rafael, Calif.

Figure 2:
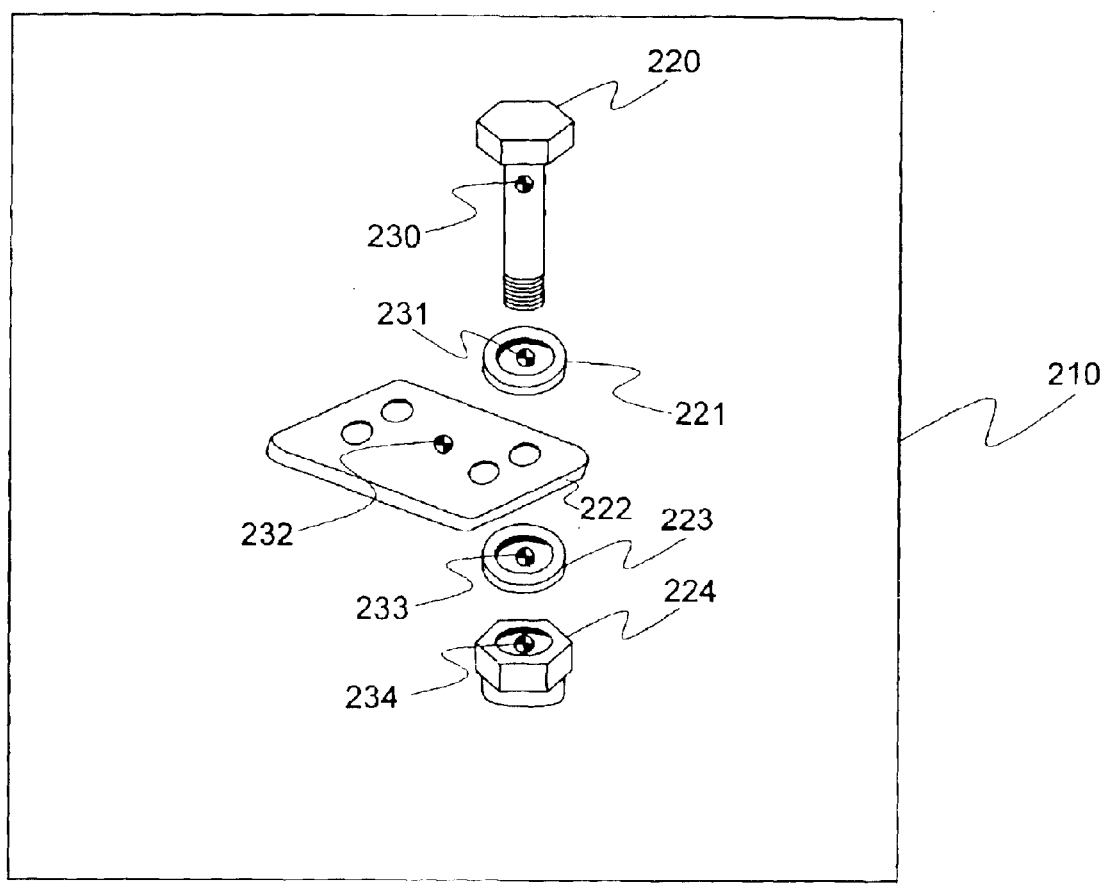
FIG. 2 illustrates a first aspect of the present invention determining if one or more geometry pieces of a mechanical design are within a view boundary and calculating a location of the centroids of solid geometry pieces.

FIG. 2 illustrates a first aspect of the present invention determining if one or more geometry pieces of a mechanical design are within a view boundary and calculating a location of the centroids of solid geometry pieces of the present invention. As shown in FIG. 2, graphical display manager 108 operates to display a graphical representation of the view boundary 210 with geometry pieces 220–224. The size and shape of the view boundary 210 is application dependent, and may be any size and shape depending upon the desired display. Preferably, it is customizable by the designer. For the illustrated embodiment, the geometry pieces 220–224 are exploded solid geometry pieces showing the components of an assembly, however, it should be appreciated that the geometry pieces 220–224 could be any type of geometry pieces known in the art including but not limited to two dimensional curves.

Additionally, for the illustrated embodiment, as shown by FIG. 2, graphical display manager 108 calculates the location of the centroids 230–234 of solid geometry pieces 220–224 within the view boundary 210. For the illustrated embodiment, the centroids 230–234 are graphically displayed within their respective geometry pieces 220–224, however, it should be appreciated that the display of centroids 230–234 is application dependent and preferably, customizable by the designer. Thus, in FIG. 2, the graphical display manager 108 calculates the location of the centroids 230–234 of the solid geometry pieces 220–224 within the view boundary 210.

Figure 3:
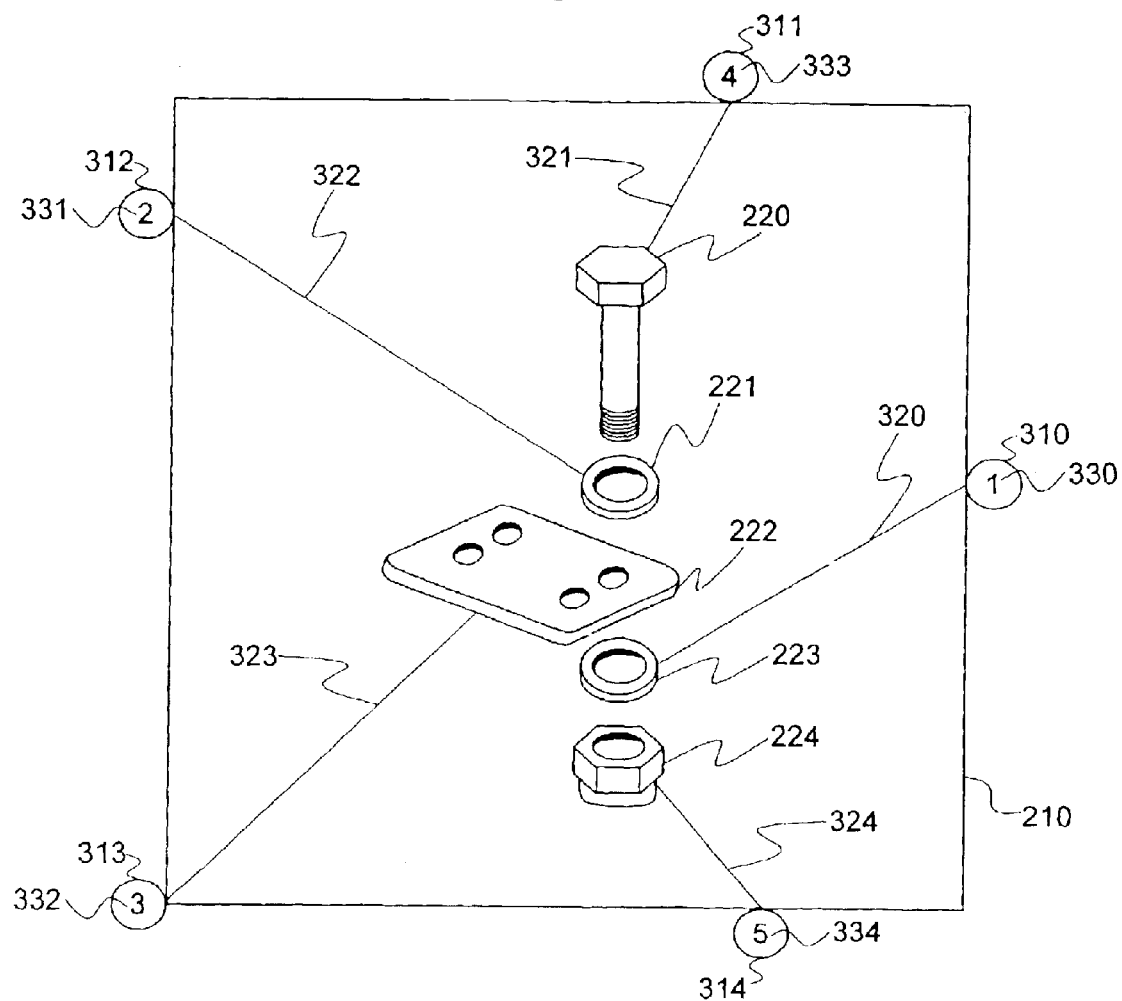
FIG. 3 illustrates a second aspect of the present invention automatically generating and ordering identifiers corresponding to the geometry pieces within the view boundary.

FIG. 3 illustrates a second aspect of the present invention automatically generating and ordering identifiers corresponding to the geometry pieces within the view boundary and ordering the identifiers. In the illustrated embodiment shown in FIG. 3, the graphical display manager 108 (shown in FIG. 1) operates to automatically generate identifiers 310–314 corresponding to the geometry pieces 220–224 around the view boundary 210. Additionally, as illustrated in FIG. 3, graphical display manager 108 generates leaders 320–324 from the location of the centroids 230–234 (shown in FIG. 2) to identifiers 310–314 corresponding to the geometry pieces 220–224 and labels 330–334 the identifiers in order. The leaders 320–324 are shown trimmed to the edges of the geometry pieces, however, it should be appreciated that the leaders can be full length to the location of the centroids or any other manner of pointing to geometry. In the illustrated embodiment, the identifiers 310–314 are shown as circles, however, it should be appreciated that any geometric shapes known in the art may be displayed including but not limited to octagon shapes. Additionally, the FIG. 3 shows the leaders 320–324 as straight lines, however, it should be appreciated that the leaders can be any geometric connectors known in the art. For the illustrated embodiment in FIG. 3, the identifiers 310–314 are spaced equidistant around the view boundary 210, however, it should be appreciated that the identifiers may be placed using other approaches including, but not limited to, placing the identifiers along the top and bottom edges of the display, or along the side edges of the display. Furthermore, the labels 330–334 of the identifiers are Arabic numerals and are ordered top to bottom on the right side 330, top to bottom on the left side 331 and 332, left to right on the top side 333, and then left to right on the bottom side 334 of the view boundary 210, however, the identifiers may be labeled using other approaches including, but not limited to, alphabet or any other special characters, and the order may for example be clockwise or counter-clockwise or the like. Thus, the identifiers are automatically generated for the designer without requiring the designer to manually create each individual identifier and its leader line for each corresponding geometry piece. As will be appreciated by those skilled in the art, the automated manner of creation of identifiers of the present invention is much less time consuming, less labor intensive, and requiring much less commands.

Figure 4:
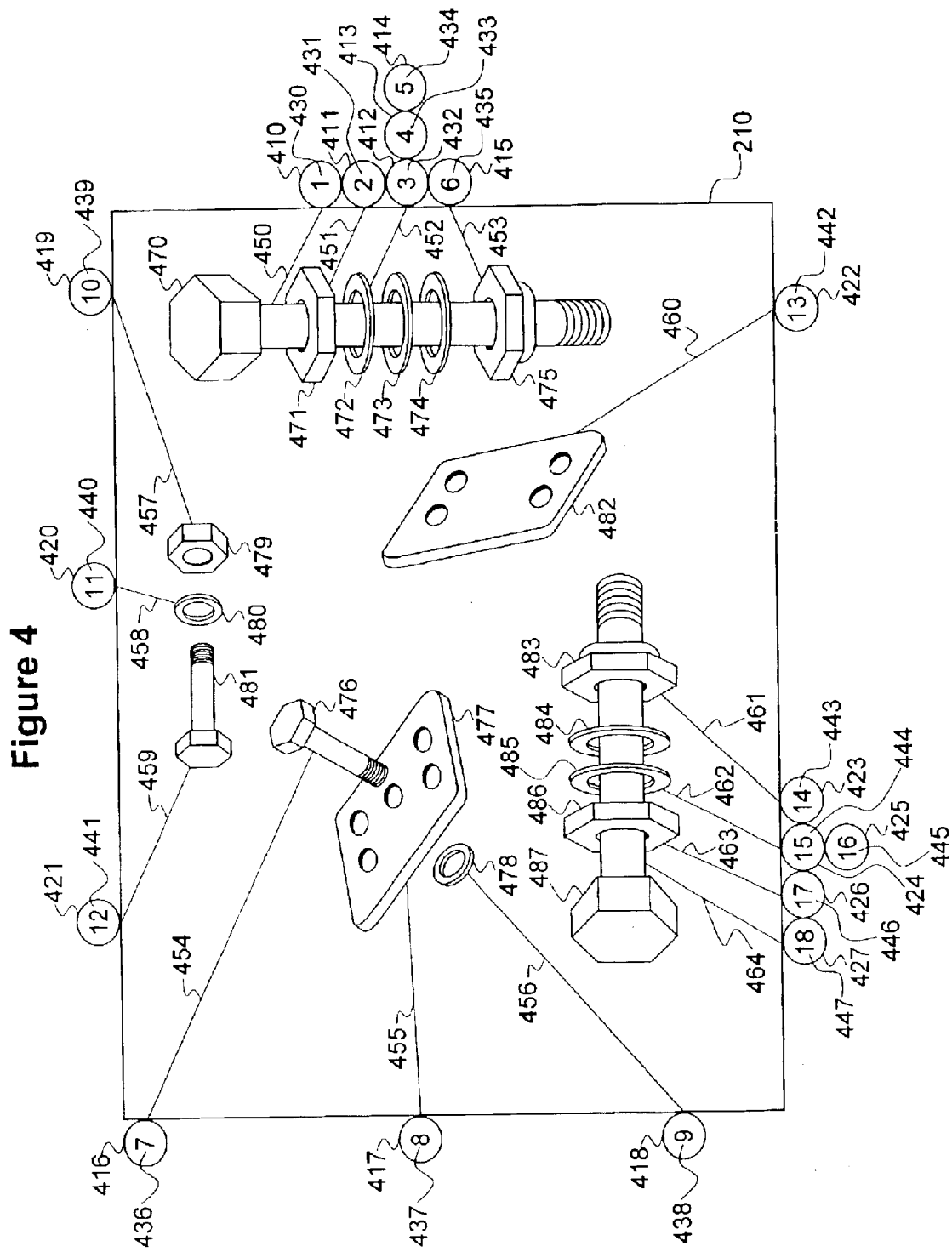
FIG. 4 illustrates another example of the first and second aspect of the present invention automatically generating and ordering the identifiers around the view boundary for more complex assemblies.

FIG. 4 illustrates another example of the first and second aspect of the present invention automatically generating and ordering identifiers corresponding to the geometry pieces within the view boundary for more complex assemblies. In the illustrated embodiment shown in FIG. 4, as previously shown, the graphical display manager 108 (shown in FIG. 1) operates to automatically generate identifiers 410–427 corresponding to the geometry pieces 470–487 around the view boundary 210. However, in the illustrated example of FIG. 4, the number of geometry pieces are more numerous and complex compared to the geometry pieces illustrated in FIG. 3.

Illustrated in FIG. 4, are exploded geometry pieces 476–481, single geometry piece not part of an assembly 482, and geometry pieces that are shown assembled together 470–475 and 483–487. In the illustrated example of FIG. 4, the graphical display manager 108 operates to automatically generate identifiers 416–418 for the exploded view of geometry pieces 476–478 and automatically generate identifiers 419–421 for exploded view of geometry pieces 479–481 around the view boundary 210. Additionally, the graphical display manager 108 operates to automatically generate an identifier 422 for the single geometry piece 482. Connecting the geometry pieces with their corresponding identifiers, the graphical display manager 108 automatically generates leaders 454–456, 457–459, and 460 from the calculated locations of the centroids (not shown) of geometry pieces 476–478, 479–481, and 482 to the identifiers 416–418, 419–421, and 422 respectively.

In the example of the illustrated embodiment shown in FIG. 4, geometry pieces 470–475 are shown as an assembly, and the graphical display manager 108 operates to automatically generate identifiers 410–415 around the view boundary 210. However, in the illustrated example of FIG. 4, the graphical display manager 108 operates to group the identifiers 410–415 together to show geometry pieces 470–475 as a combined assembly. Additionally, the graphical display manager 108 operates to arrange the identifiers 412–414 corresponding to identical geometry pieces 472–474 in a row. The row shows that the one geometry piece 472 corresponding to the one identifier 412 is one of several identical geometry pieces 473 and 474, and therefore, only one leader 452 is required for the identifiers 412–414. Individual geometry pieces 470, 471, and 475 shown as an assembly correspond to their respective identifiers 410, 411, and 415 around the view boundary 210 with leaders 450, 451, and 453.

Additionally, in the illustrated example of FIG. 4, geometry pieces 483–487 are shown as an assembly, and the graphical display manager 108 operates to automatically generate identifiers 423–427 around the view boundary 210. As illustrated above, the graphical display manager 108 operates to group the identifiers 423–427 together to show geometry pieces 483–487 as a combined assembly. Additionally, the graphical display manager 108 operates to arrange the identifiers 424 and 425 corresponding to identical geometry pieces 484 and 485 in a column. The column shows that the one geometry piece 485 corresponding to the one identifier 424 is one of another identical geometry piece 484, and therefore, only one leader 462 is required for the identifiers 424 and 425. Individual geometry pieces 483, 486, and 487 shown as an assembly correspond to their respective identifiers 423, 426, and 427 around the view boundary 210 with leaders 461, 463, and 464.

In the illustrated example of the present invention of FIG. 4, the graphical display manager 108 automatically generates identifiers 410–427 around the view boundary 210 grouping the identifiers for geometry pieces 470–475 and 483–487 shown as assemblies as if they are singular identifiers, however, it should be appreciated that the identifiers can be arranged employing other grouping approaches. The ordering of the labels 430–447 of the identifiers are Arabic numerals and are ordered top to bottom on the right side 430–435, top to bottom on the left side 436–438, left to right on the top side 439–441, and then left to right on the bottom side 442–447 of the view boundary 210, however, as described earlier, the identifiers may be labeled using alphabet or other special characters, and other orderings may be employed. Thus, in like manner, for a complex display illustrated in FIG. 4, the identifiers may nevertheless be generated for a designer without requiring the designer to manually create each individual identifier and its leader line for each corresponding geometry piece. As will be appreciated by those skilled in the art, the automatic creation of identifiers of the present invention is less time consuming, less labor intensive, and requiring much less commands.

Figure 5:
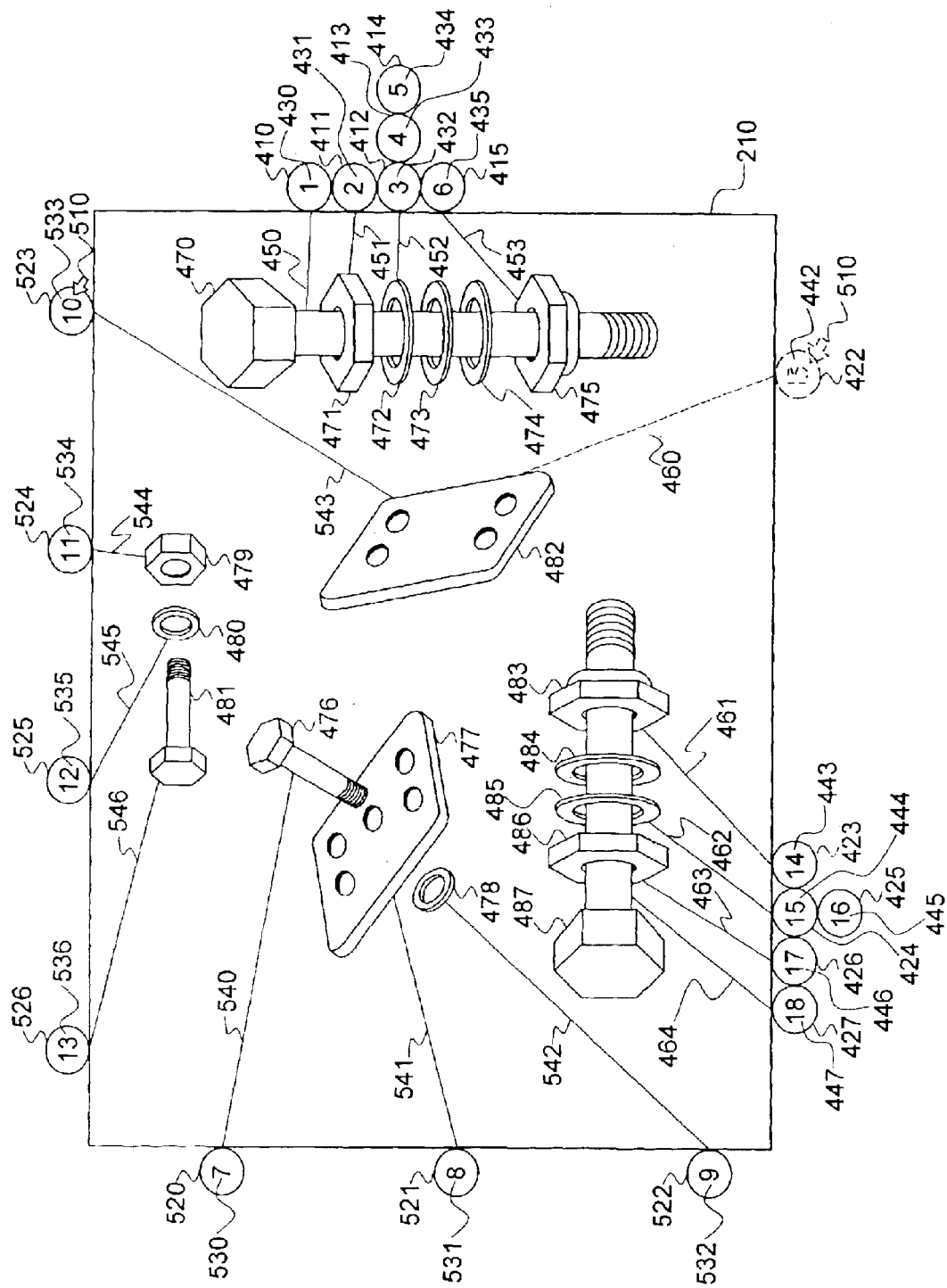
FIG. 5 illustrates a third aspect of the present invention facilitating manipulation of the identifiers around the view boundary by a designer.

FIG. 5 illustrates a third aspect of the present invention facilitating manipulation of the identifiers around the view boundary by a designer. As shown in FIG. 5, identifier 422 corresponding to geometry piece 482 is selected by a user utilizing a cursor 510, and dragged and dropped to a new location around the view boundary 210. The graphical display manager 108 operates to reorder the labels 436–438, 439–441, and 442 in response to the manipulation of the identifier 422. In the illustrated embodiment of FIG. 5, the manipulated identifier 523 has the new label 533 with the leader 460 following to become new leader 543. The new leader 543 continues to originate from the centroid (not shown) of geometry piece 482.

Additionally, as shown in FIG. 5, graphical display manager 108 operates to shift the identifiers 520–526 for the geometry pieces 476–481 respective positions around the view boundary 210 in response to the identifier 523 being dragged and dropped on the top side of the view boundary 210 with the leaders 540–542 and 544–546 continuing to point to the location of the centroids (not shown) of the geometry pieces 476–478 and 479–481. Thus the designer may manipulate the identifiers around the view boundary by using the cursor overriding the automatic generation. As will be appreciated by those skilled in the art, the manipulation of an identifier will not involve the user manually editing the order and positions of the impacted neighboring identifiers as required in prior art, resulting in less time consumption, less labor intensive, and fewer commands; a substantial improvement over the prior art manual method.

Figure 6B:
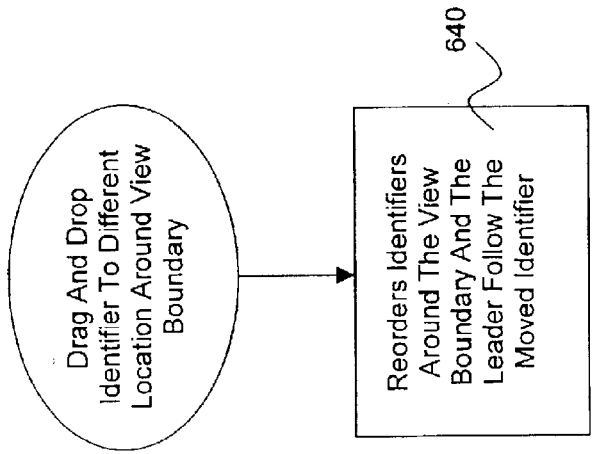
FIGS. 6a–6b illustrate one embodiment of the relevant operational flows of the graphical display manager of FIG. 1.
Figure 6A:
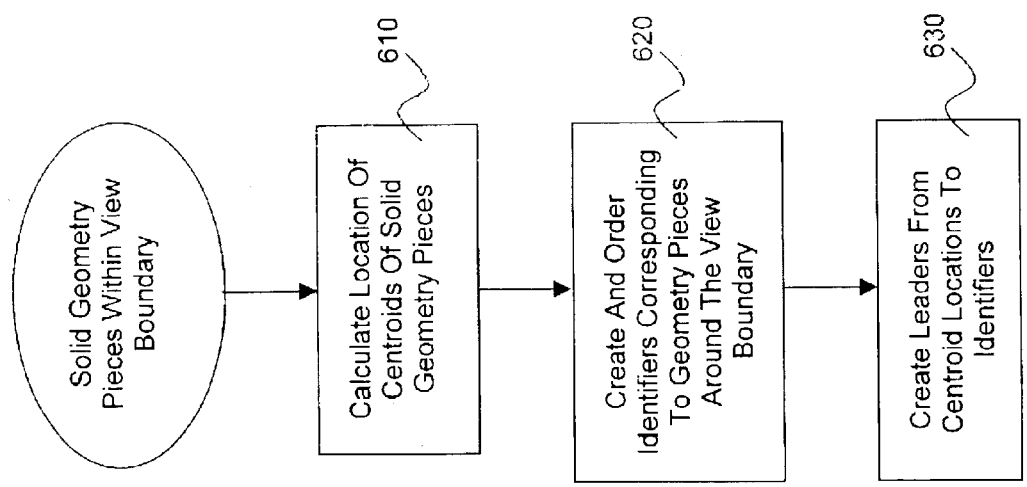

FIGS. 6a–6b illustrate one embodiment of the relevant operational flows of the graphical display manager of FIG. 1. For the illustrated embodiment, graphical display manager 108 is programmed in an event driven model, i.e., graphical display manager 108 is designed to be executed in a system environment where various event notification services are available from the operating system. One example of such operating system suitable for practicing the present invention is the Windows® operating systems, available from Microsoft Corporation of Redmond, Wash. In alternate embodiments, graphical display manager 108 may be implemented in other programming approaches known in the art.

As show in FIG. 6a, responsive to an event notification informing graphical display manager 108 of the fact that there are solid geometry pieces within a view boundary, graphical display manager 108 causes other functional blocks of drawing engine 104 to calculate the location of the centroids of the solid geometry pieces 610, generate and order identifiers corresponding to the solid geometry pieces 620, and generate leaders from the centroid locations to the identifiers around the view boundary 630. The manner in which the functional blocks effectuate the calculation of the locations of the centroids may be implemented in any one of a number of manners known in the art. The generation and ordering of the identifiers as well as generation of the leaders may be accomplished in any one of a number of application dependent manners as described earlier.

As shown in FIG. 6b, responsive to an event notification informing graphical display manager 108 of the fact that the user has dragged and dropped one or more identifiers to a different location around the view boundary, the graphical display manager 108 causes other functional blocks of drawing engine 104 to reorder the identifiers around the view boundary with the leader following the moved identifier 640. Additionally, the display manager 108 may cause other functional blocks of drawing engine 104 to change the spatial arrangement of the identifiers around the view boundary in response to the manipulation of one or more identifier with the leaders following the spatially changed identifiers. Similarly, the manner in with other functional blocks effectuate the reordering and spatial changing with leaders following the identifiers around the view boundary may be implemented in any one of a number of application dependent manners as described earlier.

Figure 7:
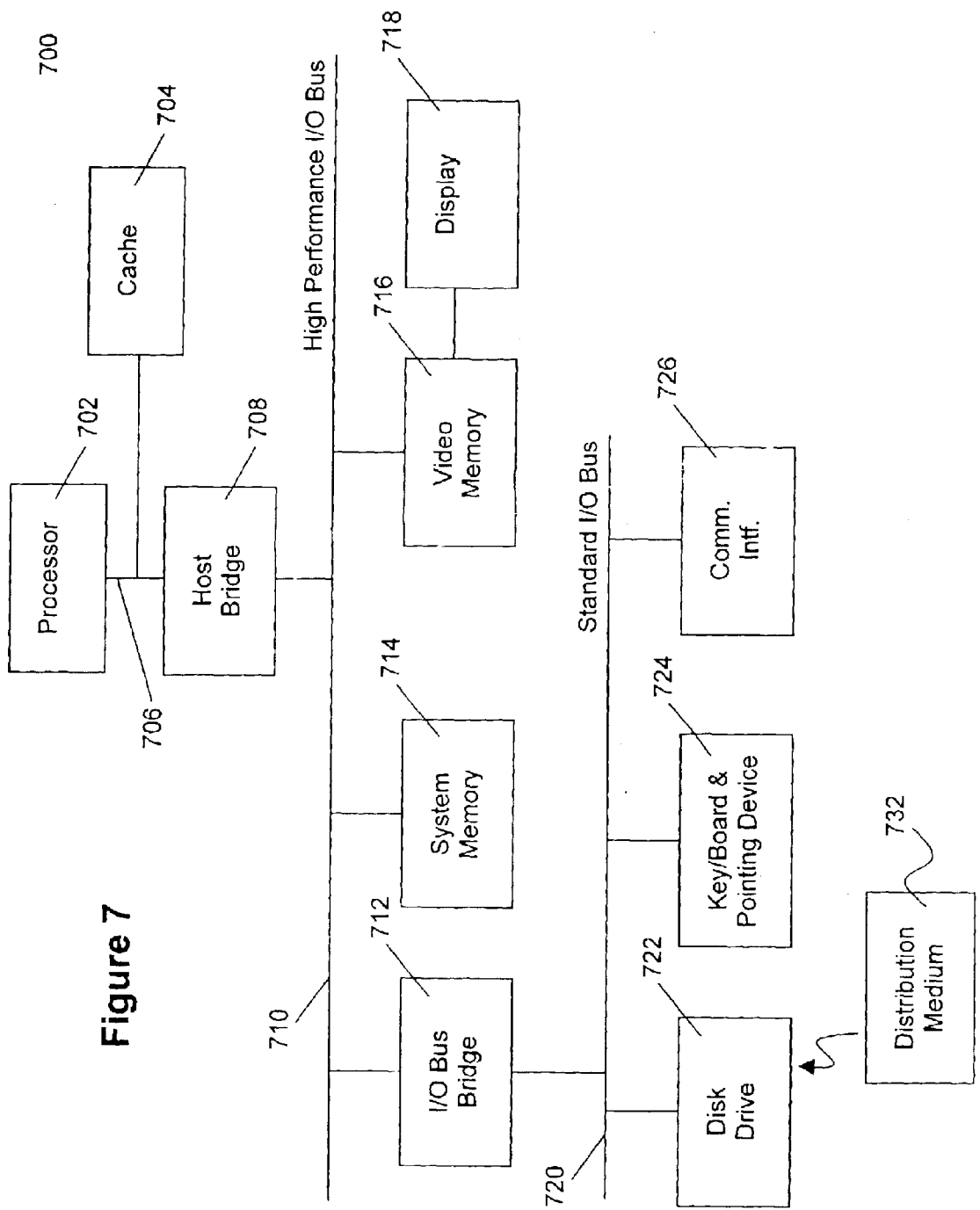
FIG. 7 illustrates one embodiment of a computer system suitable for programming with instructions that implement the present invention.

FIG. 7 illustrates one embodiment of a computer system suitable to be programmed with the mechanical design drawing application of the present invention. As shown, for the illustrated embodiment, computer 700 includes processor 702, processor bus 706, high performance I/O bus 710 and standard I/O bus 720. Processor bus 706 and high performance I/O bus 710 are bridged by host bridge 708, whereas I/O buses 710 and 712 are bridged by I/O bus bridge 712. Coupled to processor bus 706 is cache 704. Coupled to high performance I/O bus 710 are system memory 714 and video memory 716, against which video display 718 is coupled. Coupled to standard I/O bus 720 are disk drive 722, keyboard and pointing device 724, and communication interface 726.

These elements perform their conventional functions known in the art. In particular, disk drive 722 and system memory 714 are used to store permanent and working copies of the mechanical design system. The permanent copies may be pre-loaded into disk drive 722 in factory, loaded from distribution medium 732, or down loaded from a remote distribution source (not shown). Distribution medium 732 may be a tape, a CD, a DVD or other storage medium of the like. The constitutions of these elements are known. Any one of a number of implementations of these elements known in the art may be used to form computer system 700.

In general, those skilled in the art will recognize that the present invention is not limited by the details described, instead, the present invention can be practiced with modifications and alterations within the spirit and scope of the appended claims. The description is thus to be regarded as illustrative instead of restrictive on the present invention.

Thus, a mechanical design drawing application with improved facility for a designer, working with identifiers of a drawing of a mechanical design, to display and manipulate identifiers has been described.

What is claimed is:

1. A computer implemented method comprising:
    providing a graphical display of a mechanical design;
    determining if one or more geometry pieces of the mechanical design are within a view boundary, a view boundary having a size and a shape and being on a same plane as the graphical display of the mechanical design; and
    automatically generating and ordering one or more identifiers corresponding to the geometry pieces within the view boundary, wherein an identifier has a location and includes a label identifying the corresponding geometry piece and the one or more labels are ordered in accordance with the location along the view boundary of their respective identifiers.

2. The method of claim 1, wherein said automatically generating and ordering comprises placing each identifier at a location along said view boundary closest to its corresponding geometry piece.

3. The method of claim 1, wherein said automatically generating and ordering comprises placing identifiers at equidistant around the view boundary.

4. The method of claim 1, wherein said automatically generating and ordering of identifiers comprises automatically facilitating a user in manipulating identifiers around the view boundary.

5. A storage medium having stored therein a plurality of instructions that are machine executable, wherein when executed, the executing instructions operate to:
    providing a graphical display of a mechanical design;
    determining if one or more geometry pieces of the mechanical design are within a view boundary, a view boundary having a size and a shape and being on a same plane as the graphical display of the mechanical design; and
    automatically generating and ordering one or more identifiers corresponding to the geometry pieces within the view boundary, wherein an identifier has a location and includes a label identifying the corresponding geometry piece and the one or more labels are ordered in accordance with the location along the view boundary of their respective identifiers.

6. The storage medium of claim 5, wherein the executing instructions operate to place each identifier at a location along said view boundary closest to its corresponding geometry piece.

7. The storage medium of claim 5, wherein the executing instructions operate to place identifiers at equidistant around the view boundary.

8. The storage medium of claim 5, wherein the executing instructions operate to automatically facilitate a user in manipulating identifiers around the view boundary.

9. An apparatus comprising:
    a storage medium having stored therein a plurality of instructions that are machine executable, wherein when executed, the executing instructions operate to:
    provide a graphical display of a mechanical design;
    determining if one or more geometry pieces of the mechanical design are within a view boundary, a view boundary having a size and a shape and being on a same plane as the graphical display of the mechanical design; and
    automatically generating and ordering one or more identifiers corresponding to the geometry pieces within the view boundary, wherein an identifier has a location and includes a label identifying the corresponding geometry piece and the one or more labels are ordered in accordance with the location along the view boundary of their respective identifiers; and
    a processor coupled to the storage medium to execute he instructions.

10. The apparatus of claim 9, wherein the executing instructions operate to place each identifier at a location along said view boundary closest to its corresponding geometry piece.

11. The apparatus of claim 9, wherein the executing instructions operate to place identifiers at equidistant around the view boundary.

12. The apparatus of claim 9, wherein the executing instructions operate to automatically facilitate a user in manipulating identifiers around the view boundary.

* * * * *

UNITED STATES PATENT AND TRADEMARK OFFICE
CERTIFICATE OF CORRECTION

PATENT NO.         : 6,950,113 B2                                     Page 1 of 2
APPLICATION NO.    : 10/286722
DATED              : September 27, 2005
INVENTOR(S)        : David L. Gill, William E. Bogan and Kanan Lozon It is certified that error appears in the above-identified patent and that said Letters Patent is hereby corrected as shown below:

In Column 7, Claim 3, Line 39; Replace:
    "comprises placing identifiers at" with
    -- comprises placing identifiers --

In Column 7, Claim 5, Line 48; Replace:
    "providing a graphical display" with
    -- provide a graphical display --

In Column 7, Claim 5, Line 49; Replace:
    "determining if one or more" with
    -- determine if one or more --

In Column 8, Claim 5, Line 1; Replace:
    "automatically generating and ordering" with
    -- automatically generate and order --

In Column 8, Claim 5, Line 3; Replace:
    "boundary, wherein an identifier" with
    -- boundary, where an identifier --

In Column 8, Claim 7, Line 13; Replace:
    "place identifiers at equidistant" with
    -- place identifiers equidistant --

In Column 8, Claim 9, Line 23; Replace:
    "determining if one or more" with
    -- determine if one or more --

In Column 8, Claim 9, Line 28; Replace:
    "automatically generating and ordering' with
    -- automatically generate and order --

In Column 8, Claim 9, Line 30; Replace:
    "boundary, wherein an identifier" with
    -- boundary, where an identifier --

UNITED STATES PATENT AND TRADEMARK OFFICE
CERTIFICATE OF CORRECTION

PATENT NO. : 6,950,113 B2
APPLICATION NO. : 10/286722
DATED : September 27, 2005
INVENTOR(S) : David L. Gill, William E. Bogan and Kanan Lozon It is certified that error appears in the above-identified patent and that said Letters Patent is hereby corrected as shown below:

In Column 8, Claim 11, Line 43; Replace:
"place identifiers at equidistant" with
-- place identifiers equidistant --.

Signed and Sealed this

Fifth Day of December, 2006

JON W. DUDAS
*Director of the United States Patent and Trademark Office*